United States Patent

O'Banion

[11] Patent Number: 6,029,721
[45] Date of Patent: Feb. 29, 2000

[54] PORTABLE WORK BENCH

[75] Inventor: Michael L. O'Banion, Westminster, Md.

[73] Assignee: Black & Decker Inc., Newark, Del.

[21] Appl. No.: 09/320,868

[22] Filed: May 27, 1999

Related U.S. Application Data

[60] Provisional application No. 60/086,845, May 27, 1998.

[51] Int. Cl.[7] ........................................ B27C 9/02
[52] U.S. Cl. .................... 144/287; 83/471.3; 144/286.5; 269/97
[58] Field of Search .............. 144/286.1, 286.5, 144/287; 269/97, 139, 901; 83/471.3, 574

[56] References Cited

U.S. PATENT DOCUMENTS

| | | | |
|---|---|---|---|
| 3,154,304 | 10/1964 | Crawford | 269/97 |
| 4,247,090 | 1/1981 | Hanh et al. | 269/97 |
| 5,193,598 | 3/1993 | Estrem | 144/287 |
| 5,320,150 | 6/1994 | Everts et al. | 144/287 |
| 5,836,365 | 11/1998 | Derecktor | 144/286.5 |
| 5,875,828 | 3/1999 | Quiram et al. | 144/286.5 |

Primary Examiner—W. Donald Bray
Attorney, Agent, or Firm—Adan Ayala

[57] ABSTRACT

A portable work bench includes a structural body, and a platform disposed on the structural body, a clamping mechanism disposed on one of the body and the platform, the clamping mechanism comprising a rod rotatably attached to the one of the body and the platform, and a block movably connected to the rod and movable between a first position contacting the other of the body and the platform and a second position bypassing the other of the body and the platform. The work bench may also include a plurality of legs supporting the structural body. The structural body preferably has a rectangular cross-section. Preferably the rod is rotatably attached to the platform, and the rod rotates about an axis substantially parallel to the bottom surface of the platform. The rod may have an end bent away from the platform. Preferably, the block is pivotally attached to the end.

11 Claims, 3 Drawing Sheets

PORTABLE WORK BENCH

This application claims benefit of provisional application Ser. No. 60,086,845 filed May b 27, 1998.

FIELD OF THE INVENTION

This invention relates generally to work benches and more particularly to a portable work bench that can support a power tool and a workpiece.

BACKGROUND OF THE INVENTION

It is common in the construction industry for users to bring their power tools to the work site. Thus, the users require a work surface at the work site to support the power tools for use. Preferably the work surface is at a certain height so that the user can comfortably use the power tool. In addition, the work surface should also be sufficiently portable to be easily moved around a work site.

In the past, users have disposed their power tools on sheets of wood which are in turn supported by two or more sawhorses. This arrangement, however, lacks the strength for efficient operation, as well as being difficult to move around the work site.

Accordingly, different support stands or work benches have been proposed in order to provide a portable work surface that can support a power tool. Some of these prior art solutions have been described in U.S. Pat. Nos. 1,864,840, 4860,807, 4,874,025, 4,974,651, 5,193,598, and 5,421,231. However, these prior art solutions do not provide a platform supporting the power tool which can be moved horizontally so that the power tool can be moved without moving the workpiece.

Other prior art solutions, such as the one described in U.S. Pat. No. 5,592,981, provide a platform supporting the power tool which can be moved horizontally so that the power tool can be moved without moving the workpiece. However, they require that the user insert and slide the platform from the end of the workbench towards the desired position on the workbench.

SUMMARY OF THE INVENTION

In accordance with the present invention, an improved portable work bench is employed. The portable work bench includes a structural body, and a platform disposed on the structural body. In addition, the platform includes a clamping mechanism for locking the position of the platform along the structural body. Further, the portable work bench may include a plurality of legs for supporting the structural body. The structural body may be tubular and preferably has a square cross-section.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 4 is a bottom plan view of the clamping mechanism in different positions, where

DETAILED DESCRIPTION

Figure 1:
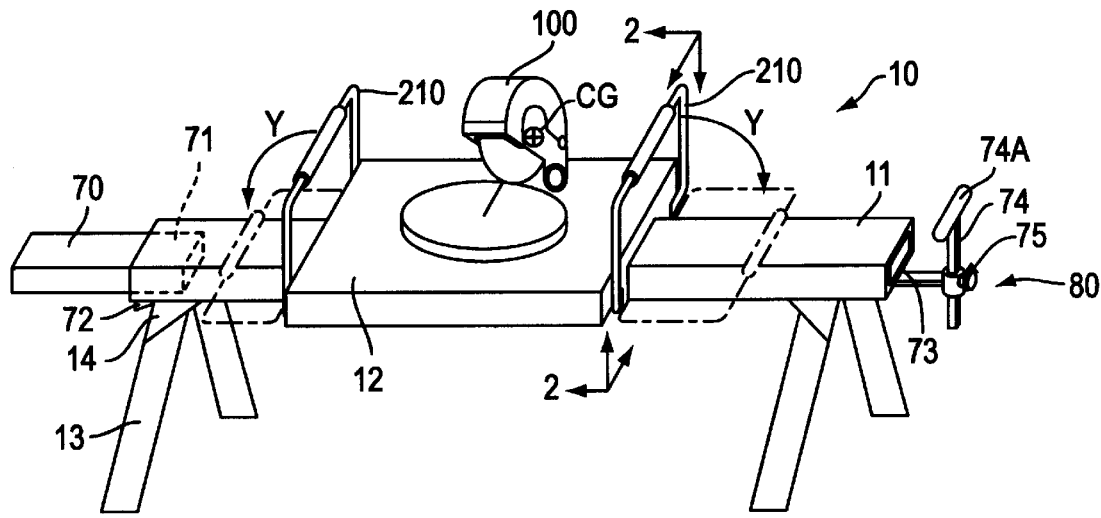
FIG. 1 is a perspective view of a portable work bench of the present invention.

The invention is now described with reference to the accompanying figures, wherein like numerals designate like parts. Referring to FIG. 1, a portable work bench 10 of the present invention is shown carrying a chop saw 100. However, persons skilled in the art will recognize that the work bench 10 can support any power tool, such as a sliding compound miter saw, a drill press, a table saw, etc., any hand tools, or anything else that needs to be supported.

The work bench 10 has a structural body 1 1 and a platform 12 disposed on the structural body 11. In addition, the work bench 10 may have legs 13 for supporting the structural body 11 and platform 12. The legs 13 may be connected to the body 11 via brackets 14 as is well known in the art. Persons skilled in the art are referred to U.S. Pat. Nos. 4,605,099 and 5,592,981, which disclose exemplary means for providing foldable legs for the work bench. However, persons skilled in the art will know that fixed legs which do not fold will also function properly.

Figure 2:
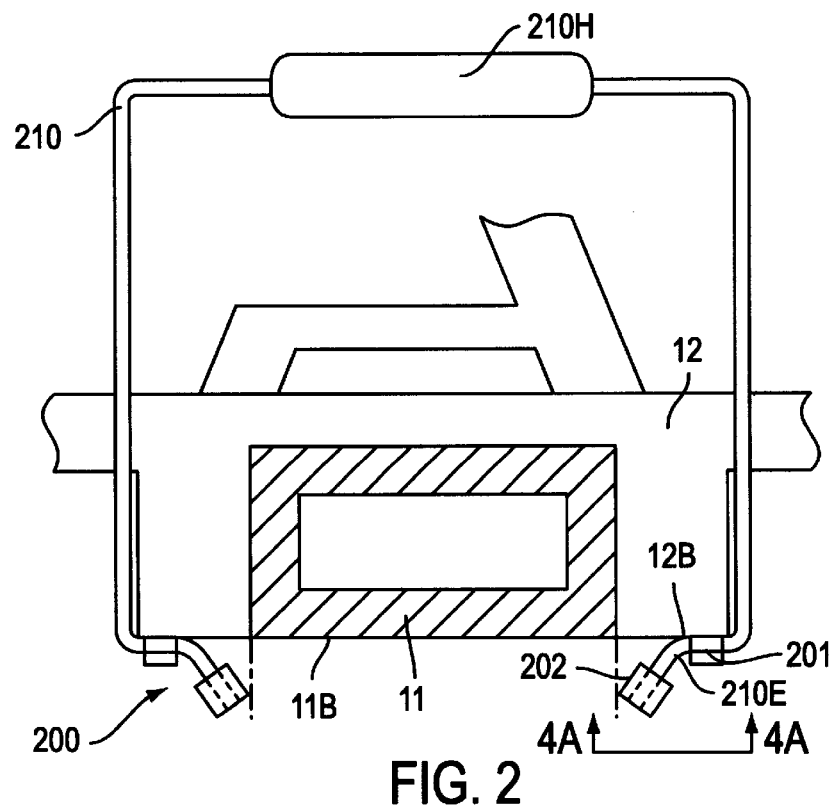
FIG. 2 is a cross-sectional side view of the work bench along plane 2—2—2 of FIG. 1, showing the clamping mechanism in the unlocked position.

Referring to FIG. 2, the structural body 11 is preferably tubular so that it can withstand substantial amounts of torsional and lateral loads applied thereto. Furthermore, the cross-section of the structural body 11 is preferably square.

The platform 12 is preferably designed to receive a power tool 100 thereon in the manner well known in the art. As mentioned above, the platform 12 is disposed on the structural body 11. As seen in FIG. 2, the platform 12 may contact the top, front and rear surfaces of the body 11. Preferably, the bottom surface 11B of body 11 and the bottom surface 12B of platform 12 are substantially coplanar.

Referring to FIG. 2, platform 12 may have at least one clamping mechanism 200, preferably four mechanisms. Persons skilled in the art will recognize that the clamping mechanism may be disposed on body 11, or on both body 11 and platform 12.

The clamping mechanism 200 is preferably attached to the underside of platform 12. Clamping mechanism 200 comprises a rod 210 which is pivotably received underneath platform 12 by a sleeve 201, which is in turn fixedly attached to platform 12. Sleeve 201 receives rod 210 so that rod 210 can rotate about a longitudinal axis A. Rod 210 preferably has an end 210E which is bent at an angle from axis A. Preferably, end 210E will project downwardly when the clamping mechanism is in the unlocked position, as shown in FIG. 2.

Figure 3:
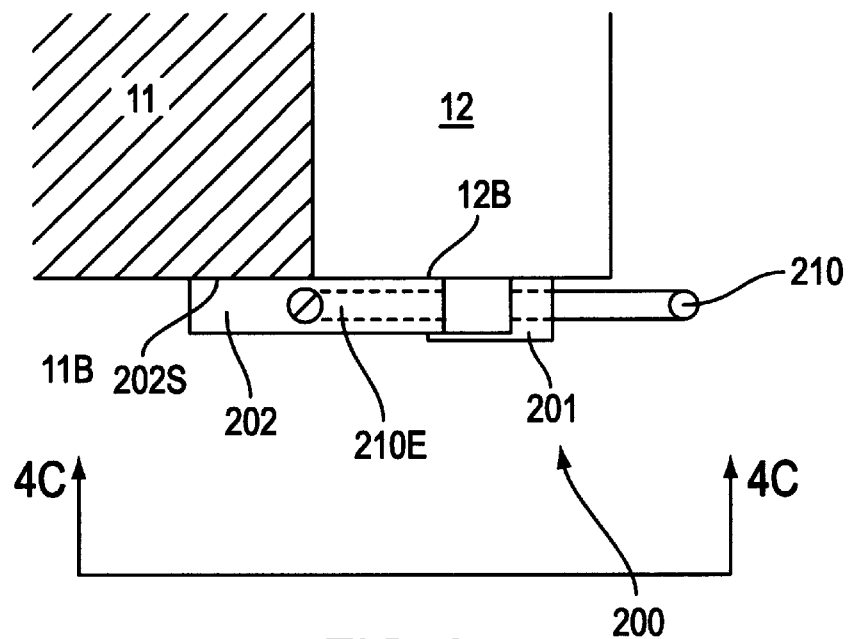
FIG. 3 is a partial cross-sectional side view of the work bench showing the clamping mechanism in the locked position.

A block 202 may be pivotally attached to end 210E, so that block 202 can pivot about end 210E. While it is preferable that block 202 contact the bottom surface 11B of body 11 to lock the platform 12 in place, as shown in FIG. 3, block 202 is not required to contact the bottom surface 12B of platform 12. However, as alternate embodiments, block 202 may contact the bottom surface 12B of platform 12 at any time, and could contact bottom surface 12B at all times.

The clamping mechanism 200 is preferably designed so that, at the unlocked position, block 202 will clear body 11. This allows for easy installation and removal as the user need only drop platform 12 on body 11 at the desired position along body 11. Also the clamping mechanism 200 is preferably designed so that, upon rotation of rod 210, the block 202 will contact the bottom surface 11B of body 11, locking the platform 12 in place, as shown in FIG. 3.

Figure 4A:
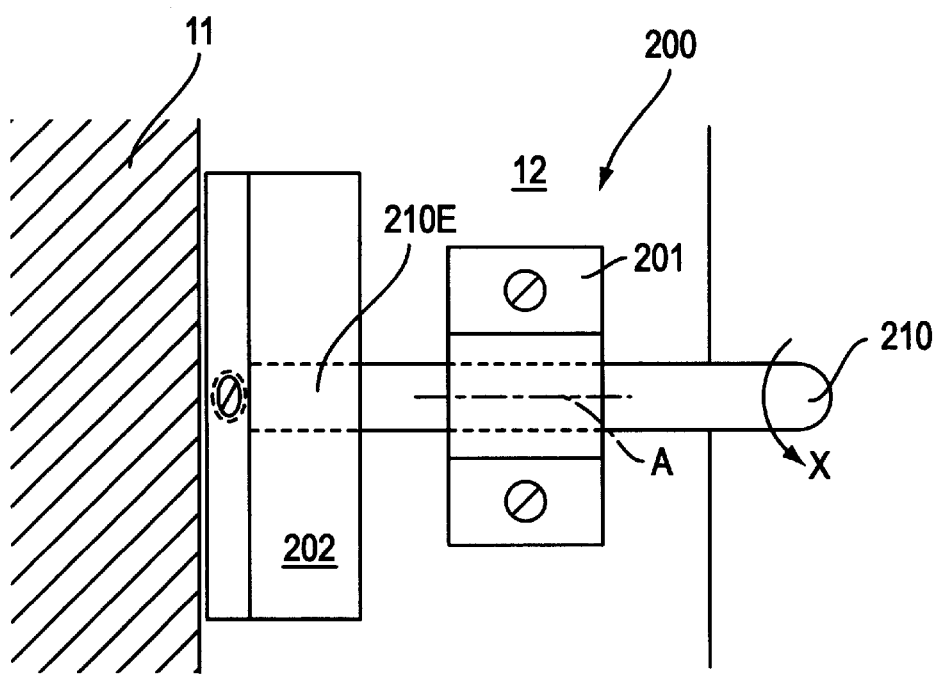
FIG. 4A is a bottom plan view along line 4A—4A of FIG. 2, showing the clamping mechanism in the unlocked position.
Figure 4B:
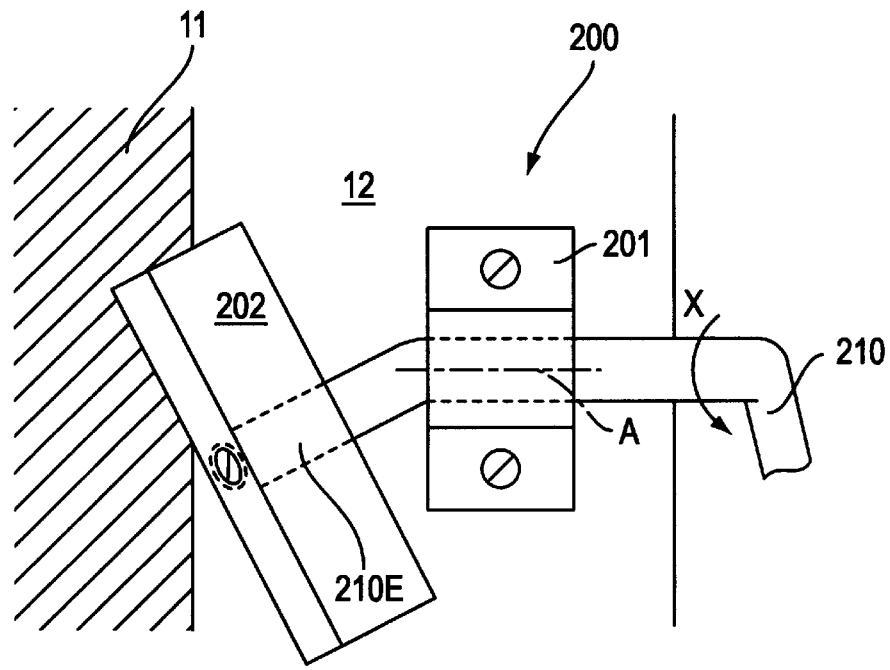
FIG. 4B is a bottom plan view showing the clamping mechanism in an intermediate position between the unlocked and locked positions of FIGS. 4A and 4C, respectively.

Referring now to FIG. 4A, clamping mechanism 200 is in the unlocked position. As the user rotates rod 210 along direction X, rod 210 rotates about axis A. End 210E rotates also, as shown in FIG. 4B. Because block 202 is pivotally mounted on end 210E, and because block 202 is contacting bottom surface 12B of platform 12, block 202 rotates about end 210E. Accordingly, as block 202 rotates, part of block 202 will contact both bottom surfaces 11B, 12B.

Figure 4C:
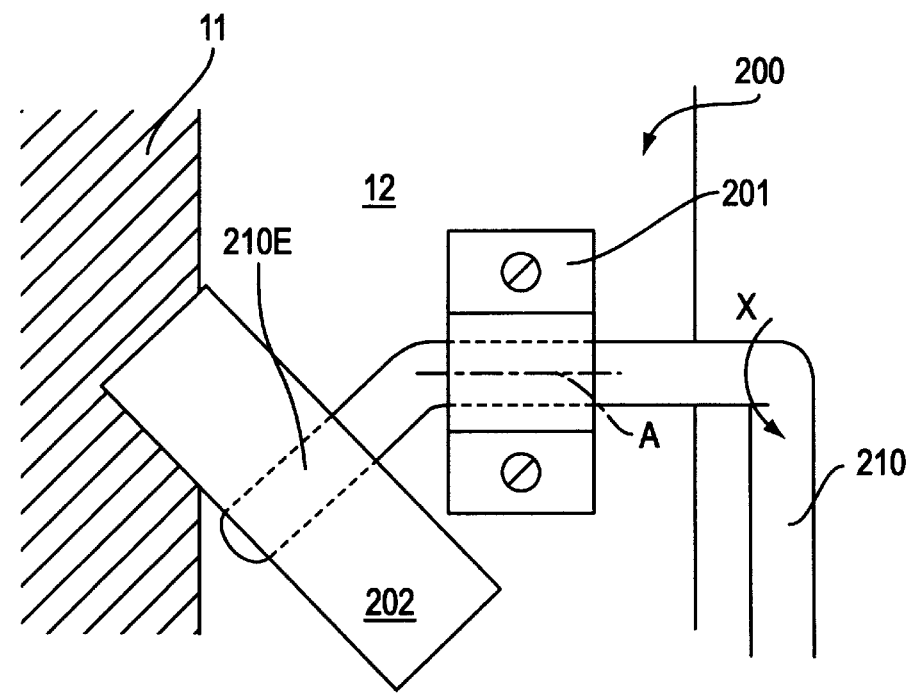
FIG. 4C is a bottom plan view along line 4C—4C of FIG. 3, showing the clamping mechanism in the locked position.

As the user continues to rotate rod 210, end 210E and block 202 continue to rotate until a contacting surface of block 202 contacts and/or becomes substantially flush with surface 11B as shown in FIG. 3. Preferably, block 202 contacts both bottom surfaces 11B, 12B with its side surface 202S and locking platform 12, as shown in FIGS. 3 and 4C. At that moment, the axis of end 210E may be parallel to bottom surface 12B and/or substantially coplanar with axis A.

Preferably, rod 210 connects two clamping mechanisms disposed at opposite sides of body 11, as shown in FIG. 2. Another rod 210 may be provided connecting two other clamping mechanisms disposed at the other end of platform 12, as shown in FIG. 1.

Handles 210H may be provided on rods 210 so that the user can comfortably grip rods 210 and carry the tool/platform combination. Preferably handles 210H are disposed so that they are above the center of gravity of the tool/platform combination when in the unlocked position. Handles 210H may also be disposed so that, when rods 210 are rotated along direction Y, handles 210H contact body 11.

Persons skilled in the art will recognize that extensions can be added to the portable work bench as is well known in the art. Referring to FIG. 1, extension 70 can be inserted into the structural body 11 in order to increase its length, allowing the user to move or place the platform 12 along a greater length. Preferably, extension 70 has the same cross-section as the structural body 11. Extension 70 preferably has a fixed inner joint 71, which can be inserted into the structural body 11. The joint 71 can then be secured by means of a screw or pin assembly 72.

A workpiece support mechanism 80 can also be used on the work bench. This mechanism can support an elongated workpiece, such as moldings, etc., so that the user can cut it accurately.

The support mechanism 80 has a bar 73, which is slidably attached to the structural body 11. A clamp assembly 75 is disposed at the end of bar 73. The clamp assembly 75 slidably receives and clamps a bar 74. A support end 74a is in turn disposed at the end of bar 74. Accordingly, a user can adjust the bar 74 and support end 74a, and then adjust the bar 73 so that the workpiece is properly supported.

Persons skilled in the art may recognize other additions or alternatives to the means disclosed herein. However, all these additions and/or alterations are considered to be equivalents of the present invention.

What is claimed is:

1. A portable work bench comprising:

a structural body; and a platform disposed on the structural body;

a clamping mechanism disposed on one of the body and the platform, the clamping mechanism comprising a rod rotatably attached to said one of the body and the platform, and a block movably connected to the rod and movable between a first position contacting the other of the body and the platform and a second position bypassing the other of the body and the platform.

2. The work bench of claim 1, further comprising a plurality of legs supporting the structural body.

3. The work bench of claim 1, wherein the structural body is tubular.

4. The work bench of claim 1, wherein the structural body has a rectangular cross-section.

5. The work bench of claim 1, wherein the rod is rotatably attached to the platform.

6. The work bench of claim 5, wherein the rod has an end bent away from the platform.

7. The work bench of claim 6, wherein the block is pivotally attached to the end.

8. The work bench of claim 5, wherein the rod rotates about an axis.

9. The work bench of claim 8, wherein the axis is substantially horizontal.

10. The work bench of claim 1, further comprising an extension that can be installed at an end of said structural body.

11. The work bench of claim 1, further comprising a support mechanism installed at an end of said structural body for supporting an elongated work piece.

* * * * *